US010108475B2

(12) United States Patent
Chikabelapur et al.

(10) Patent No.: US 10,108,475 B2
(45) Date of Patent: Oct. 23, 2018

(54) PATTERN ANALYSIS FOR TRIAGING MEMORY LEAKS

(71) Applicant: Oracle International Corporation, Redwood Shores, CA (US)

(72) Inventors: Venkatesh Vinod Chikabelapur, Bangalore (IN); Pradeep Krishnappa, Kammardi (IN)

(73) Assignee: Oracle International Corporation, Redwood Shores, CA (US)

( * ) Notice: Subject to any disclaimer, the term of this patent is extended or adjusted under 35 U.S.C. 154(b) by 62 days.

(21) Appl. No.: 14/464,586

(22) Filed: Aug. 20, 2014

(65) Prior Publication Data

US 2016/0055043 A1 Feb. 25, 2016

(51) Int. Cl.
*G06F 11/00* (2006.01)
*G06F 11/07* (2006.01)

(52) U.S. Cl.
CPC .......... *G06F 11/079* (2013.01); *G06F 11/073* (2013.01); *G06F 11/0778* (2013.01)

(58) Field of Classification Search
CPC ............... G06F 11/073; G06F 11/0778; G06F 11/0781; G06F 11/0754
See application file for complete search history.

(56) References Cited

U.S. PATENT DOCUMENTS

| | | | |
|---|---|---|---|
| 7,234,080 B2 * | 6/2007 | Cirne | G06F 11/3476 714/38.12 |
| 7,434,206 B2 | 10/2008 | Seidman et al. | |
| 7,496,615 B2 | 2/2009 | Broussard | |
| 7,500,079 B2 | 3/2009 | Becker | |
| 7,734,666 B2 | 6/2010 | Simeonov et al. | |
| 7,743,280 B2 | 6/2010 | Brady | |
| 7,904,754 B2 | 3/2011 | Cates | |
| 8,032,568 B2 | 10/2011 | Chacko et al. | |
| 8,504,996 B2 | 8/2013 | Zagatta | |
| 8,539,454 B2 | 9/2013 | Havin | |
| 2008/0072007 A1 * | 3/2008 | Zagatta | G06F 12/023 711/170 |
| 2009/0327373 A1 * | 12/2009 | Chacko | G06F 11/3612 |
| 2010/0153922 A1 * | 6/2010 | Obata | G06F 11/366 717/124 |

(Continued)

FOREIGN PATENT DOCUMENTS

WO 2012/127482 9/2012

OTHER PUBLICATIONS

Obasanjo, Understanding XML, Jul. 2003, Microsoft Corporation, p. 1.*

(Continued)

*Primary Examiner* — Bryce P Bonzo
*Assistant Examiner* — Jonathan D Gibson
(74) *Attorney, Agent, or Firm* — Kilpatrick Townsend & Stockton LLP

(57) ABSTRACT

A method of analyzing out-of-memory errors may include receiving a memory dump generated in response to an out-of-memory error, receiving an identification of an object class in the memory dump as a leak suspect that may be responsible for the out-of-memory error, matching the leak suspect with an analysis pattern specific to the object class, and extracting usage information from the memory dump using the analysis pattern.

20 Claims, 13 Drawing Sheets

(56) References Cited

U.S. PATENT DOCUMENTS

2011/0276610 A1* 11/2011 Hossain ............ G06F 17/30607 707/813
2011/0283163 A1* 11/2011 Zheng ................. G06F 11/362 714/763

OTHER PUBLICATIONS

Obasanjo, Understanding XML, Jul. 2003, Microsoft Corporation.*

Mitchell, et al. "LeakBot: An Automated and Lightweight Tool for Diagnosing Memory Leaks in Large Java Applications," Lecture Notes in Computer Science vol. 2743, 2003, retrieved from http://link.springer.com/chapter/10,1007%2F978-3-540-45070-2_16 on Oct. 31, 2013, 7 pages.

De Pauw, et al. "Visualizing Reference Patterns for Solving Memory Leaks in Java," Lecture Notes in Computer Science vol. 1628, 1999, retrieved from http://link.springer.com/chapter/10.1007/3-540-48743-3_6#page-2 on Oct. 31, 2013, 3 pages.

Unknown, "Memory Analyzer (MAT)" Eclipse Memory Analyzer Open Source Project, retrieved from http://www.eclipse.org/mat/ on Oct. 31, 2013, 2 pages.

Sedlacek, "Uncovering Memory Leaks Using NetBeans Profiler," retrieved from https://netbeans.org/kb/articles/nb-profiler-uncoveringleaks_pt1.html on Oct. 31, 2013, 4 pages.

Unknown, "Getting Started: Memory leak analysis," retrieved from http://publib.boulder.ibm.com/infocenter/rtnlhelp/v6r0m0/index.jsp?topic=%2Fcom.ibm.rational.pd.prof.doc.user%2Ftopics%2Fm_pd_gs_leaks.htm on Oct. 31, 2013, 2 pages.

Sun, "Profiling Object Life Ranges for Detecting Memory Leaks in Java Virtual Machine," School of Computer Science and Engineering, Beihang University, retrieved from http://ieeexplore.ieee.org/xpl/articleDetails.jsp?tp=&arnumber=6589256&searchField%3DSearch_All%26queryText%3Dmemory+leak+analysis+for+JVM on Oct. 31, 2013, 2 pages.

Hao-Lin, et al. "Research on memory leakage in Java application," School of Information Science and Engineering, WuHan University of Science and Technology, retrieved from http://ieeexplore.ieee.org/xpl/articleDetails.jsp?tp=&arnumber=5563623&searchField%3DSearch_All%26queryText%3Dmemory+leak+anaysis+for+JVM on Oct. 31, 2013, 2 pages.

* cited by examiner

○ OOM Diagnostics Report  □ ▢ ✕

Leak Suspect 1: "applcore.oaext.model.OAViewRowImpl"

63,361 instances of "applcore.oaext.model.OAViewRowImpl" occupying 509,677,896 (15.99%) bytes.

Information: The following table provides details for the specific VO's, AM's and underlying Queries for the Leak Suspect "applcore.oaext.model.OAViewRowImpl." You should focus on rows having "Retained Heap Percentage" > 50%, which are most likely the root cause of the OOM. Note: OAViewRowImpl provides access to a "view row object." An object of this class is instantiated for each record that is returned by the row's view object query.

| Attributes | No. Instances | Retained Heap | Retained % | Query |
|---|---|---|---|---|
| ViewAccessorName: ...PartyUniqueNameExistVA<br>VOName: ...core.view.PartyVVO<br>AMName: ...applicationModule.SalesPartyAM | 63,336 | 509,670,727 bytes | 509,670,727 bytes (100.00%) | SELECT PartyEO.PARTY_ID, PartyEO.PARTY_NUMBER, PartyEO.PARTY_NAME, PartyEO.PARTY_TYPE... |
| ViewAccessorName: ...CreatedModuleLookupVO<br>VOName: ...common.view.HzLookupPVO<br>AMName: ...applicationModule.SalesPartyAM | 178 | 22,796 bytes | 22,796 bytes (0.00%) | SELECT HzLookupPEO.LOOKUP_TYPE WHERE (((HzLookupPEO.= :BindLookupType)) AND ((... |
| ViewAccessorName: ...CreatedModuleLookupVO<br>VOName: ...core.view.PartyUsageAssignmentVVO<br>AMName: ...applicationModule.SalesPartyAM | 178 | 22,796 bytes | 22,796 bytes (0.00%) | SELECT HzLookup_TYPE, HzLookupPEO.LOOKUP_CODE, HzLookupPEO.MEANING FROM(... |
| ViewAccessorName: ...PartyUsageAssignmentVVO<br>VOName: ...core.view.PartyUsageAssignmentVVO<br>AMName: ...applicationModule.SalesPartyAM | 21 | 3,192 bytes | 3,192 bytes (0.00%) | SELECT PartyEO.PARTY_ID, PartyUsageAssignmentEO.PARTY_ID, ... |

FIG. 7

PATTERN ANALYSIS FOR TRIAGING MEMORY LEAKS

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

Many errors may occur when using large software systems, such as Enterprise Software Systems. One common error is an out-of-memory (OOM) error. An OOM error is a state of computer operation where no additional memory can be allocated for use by applications or the operating system of the computer system. When such an error occurs, the computer system will be unable to load any additional programs or perform any additional computations that require new memory allocation. Since many programs load additional data into memory during execution, currently running applications may cease to function correctly. An OOM error occurs when all available memory, often including virtual memory, has been allocated.

BRIEF SUMMARY

In some embodiments, a method of analyzing out-of-memory errors may be presented. The method may include receiving a memory dump generated in response to an out-of-memory error, receiving an identification of an object class in the memory dump as a leak suspect that may be responsible for the out-of-memory error, matching the leak suspect with an analysis pattern specific to the object class, and extracting usage information from the memory dump using the analysis pattern.

In some embodiments, a non-transitory computer-readable medium may be presented. The computer-readable memory may comprise a sequence of instructions which, when executed by one or more processors, causes the one or more processors to perform operations including receiving a memory dump generated in response to an out-of-memory error, receiving an identification of an object class in the memory dump as a leak suspect that may be responsible for the out-of-memory error, matching the leak suspect with an analysis pattern specific to the object class, and extracting usage information from the memory dump using the analysis pattern.

In some embodiments, a system may be presented. The system may include one or more processors and a memory communicatively coupled with and readable by the one or more processors. The memory may comprise a sequence of instructions which, when executed by the one or more processors, cause the one or more processors to perform operations including receiving a memory dump generated in response to an out-of-memory error, receiving an identification of an object class in the memory dump as a leak suspect that may be responsible for the out-of-memory error, matching the leak suspect with an analysis pattern specific to the object class, and extracting usage information from the memory dump using the analysis pattern.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 7 illustrates an exemplary interface for displaying the query results from an analysis pattern, according to some embodiments.

DETAILED DESCRIPTION

Described herein, are embodiments for analyzing and diagnosing root causes of out-of-memory (OOM) errors in computer systems. A memory dump generated in response to an OOM error can be analyzed to identify "leak suspects" that, based on the number of instances in the memory dump (i.e accumulation point), may be responsible for the OOM error. Each leak suspect may be identified by an object class defined in an application framework. A library of "analysis patterns" can be generated based on the particular definitions of the application framework to extract information from the memory dump to further analyze and refine the leak suspects and pinpoint the root cause of the OOM error. Each analysis pattern can include an application framework query that extracts usage information for the object class as a whole as well as individual variables or instances of the object class.

This usage information can be used to generate concise reports that identify a root cause of the OOM, such as an original database query.

Figure 1:
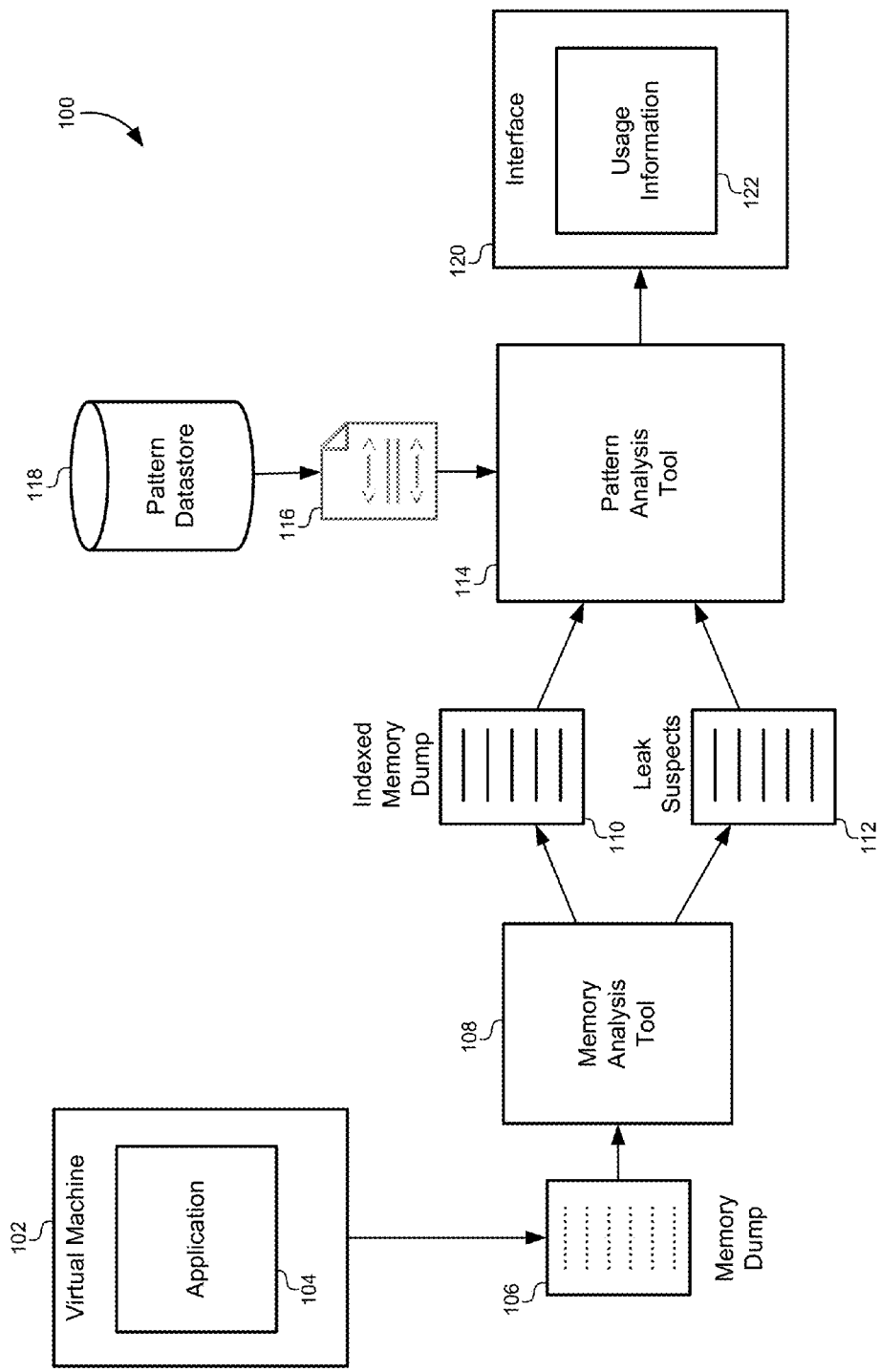
FIG. 1 illustrates a block diagram of a system for analyzing out-of-memory (OOM) errors, according to some embodiments.

FIG. 1 illustrates a block diagram of a system 100 for analyzing out-of-memory errors, according to some embodiments. Generally, the embodiments described herein may be implemented in any computer system that experiences an OOM error. Merely by way of example, FIG. 1 illustrates a virtual machine 102 running an application 104. The virtual machine 102 may run on any type of computer system, including a server, a laptop computer, a client device, a thin client, and/or the like.

In many cases, the application 104 may be deployed on a virtual machine 102 and developed using an application framework. As used herein, the term "application framework" may refer to a software framework used by software developers to implement a standard structure for applications. Application frameworks may include tools to develop/build new applications, by means of designing, implementing the business layer logic and the user interface (UIs). Many application frameworks may include a library of pre-existing classes that can be used or extended in the development of new applications. Many application frameworks are currently in existence, and may include any of the application frameworks developed by/for Apple Inc., such as MacApp, Powerplant, MacZoop, and/or Carbon. Other popular application frameworks may include the Microsoft Foundation Class Library; cross-platform application frameworks, such as Qt, wxWidgets, FOX toolkit, and/or Eclipse RCP; Java-oriented application frameworks, such as the Oracle Application Development Framework (Oracle ADF); and/or freeware frameworks that are part of the Mozilla, OpenOffice.org, GNOME, KDE, NetBeans, and/or Eclipse projects. The application 104 described herein may be developed and/or executed in relation to any of these existing application frameworks as well as any other type of application framework not listed explicitly herein that would be known by one having skill in the art.

An OOM error occurs when all available memory in the computer system has been allocated. This can prevent the computer system from loading additional programs and can cause currently running programs to cease functioning correctly. In a JVM, this can halt the JVM, as the JVM cannot create a "new" instance/allocate memory to an object because it is out of memory, and no more memory can be made available by the garbage collector. Generally, when an OOM error occurs, the only available diagnostic information comes in the form of a memory dump 106. The OOM error may trigger a process that writes the contents of the memory of the computer system (e.g., RAM, virtual memory, etc.) to disk. Thus, the memory dump 106 may include a snapshot of memory at the time the OOM error occurred. In some cases, the virtual machine 102 may be responsible for capturing and saving the memory dump 106. The memory dump 106 may also be referred to as a binary dump, binary heap dump, heap dump, and in the case of a Java virtual machine, a JVM heap (.hprof file).

The embodiments described herein provide methods and systems that analyze the contents of the memory dump 106 in order to provide an indication of the root cause the OOM error. First, the memory dump 106 can be processed by a memory analysis tool 108. The memory analysis tool 108 can be configured to identify "leak suspects," or identify the "accumulation points" of those object classes that occupy a large percentage of the memory dump 106. Most OOM errors are caused by a process continually allocating new objects without releasing the associated memory when those objects are no longer needed. For example, a process may include a loop that allocates a predefined number of objects (e.g. mallac( )). If the memory associated with those objects is not released (e.g. free( )) when the objects are no longer needed, then more objects will be allocated every time the loop executes until an OOM error occurs. There are a number of commercially available memory analysis tools that may be used as the memory analysis tool 108 in FIG. 1, including the HeapAnalyzer tool from IBM™ and/or the Eclipse™ Memory Analyzer.

The memory analysis tool 108 can be used to generate a list of leak suspects 112 that may be responsible for the OOM error. Some memory analysis tools may also generate an indexed memory dump 110 that may also be useful in the analysis process. Note that some embodiments can make use of the indexed memory dump 110, while other embodiments can simply use the original memory dump 106 provided by the virtual machine 102. The list of leak suspects 112 may include a listing of all object classes represented in the memory dump 106 that occupy more than a threshold percentage or threshold amount of memory. The list of leak suspects 112 may also be characterized as the top N object classes represented in the memory dump 106. The memory analysis tool 108 can expose an API interface that provides access to the indexed memory dump 110 as well as the list of leak suspects 112.

A pattern analysis tool 114 may be implemented to analyze the memory dump 106 (or the indexed memory dump 110) and the list of leak suspects 112 to further refine the information provided by the memory analysis tool 108. Prior to this disclosure, software engineers troubleshooting an OOM error would be required to manually triage the information based only on the list of leak suspects 112 provided by the memory analysis tool 108. This involved a manual process of examining each leak suspect and by trial-and-error selecting amongst all of the available information for the particular object classes identified as a leak suspect to find some clue as to the root cause of the OOM error. The list of leak suspects 112 may identify each leak suspect by object class. For example, the object java-.lang.string[ ] object class may be identified by the memory analysis tool 108. However, the memory analysis tool 108 generally provides no indication of which instances of the object class may be the root cause of the OOM error. Many applications within an application framework may share and utilize the same object classes, so simply identifying an object class as a leak suspect does very little to identify a root cause. Additionally, any analysis of an object class requires an intimate familiarity with the underlying application framework. Generally, a memory analysis tool 108 is a commercial tool that can be applied to any type of memory dump. The memory analysis tool 108 lacks knowledge of the details of the underlying application framework. For example, the Eclipse Memory Analyzer tool does not have the ability to parse the plethora of object class information available for objects defined as part of the Oracle Application Development Framework. Therefore, the memory analysis tool 108 is simply unable to provide the type of framework-specific analysis that would be required to sort the instance- and/or application-specific data needed to identify the root cause of an OOM error.

To provide the framework-specific analysis required to identify a root cause of an OOM error, the embodiments described herein may use a plurality of framework-specific analysis patterns. As used herein, the term "analysis pattern" may broadly referred to a collection of data that is specific to an underlying application framework and used to extract additional information from a memory dump for a particular leak suspect. In some cases, analysis patterns for potential leak suspects can be defined by application developers prior to the occurrence of an OOM error. For example, as part of developing the application 104, an application developer may generate a number of analysis patterns that can be used to analyze particular object classes used in the application 104. The application 104 may include certain code segments that allocate new objects in memory repeatedly, which may be ripe for generating OOM errors. Recognizing this, an application developer can generate an analysis pattern for class objects that are allocated within the application 104 and tailor the analysis patterns to extract and present usage information about the object classes in such a way that the root cause of the OOM error is readily apparent. Examples of the content and format of exemplary analysis patterns will be described in greater detail later in this disclosure.

The plurality of framework-specific analysis patterns can be stored in a pattern datastore 118. In some embodiments, the analysis patterns may be stored as XML files according to a defined schema that is also specific to the application framework. The pattern analysis tool 114 can analyze each leak suspect in the list of leak suspects 112 individually by matching the leak suspect with a specific pattern 116. For example, the pattern analysis tool 114 can look up the specific pattern 116 for the object class identified as one of the leak suspects in the list of leak suspects 112.

The pattern analysis tool 114 can cycle through any or all of the list of leak suspects 112, selecting individual analysis patterns from the pattern datastore 118. Some embodiments may process each leak suspect individually and generate a report for each leak suspect. Other embodiments may analyze the leak suspects of the batch and generate a report that compares/contrasts the usage information for the list of leak suspects 112.

The pattern analysis tool 114 can generally take the information provided by the specific pattern 116 and generate usage information 122. As used herein, the term "usage information" may refer broadly to any information extracted from the memory dump 106 that goes beyond the information provided by the memory analysis tool 108 for a particular object class in the application framework. In some embodiments, the usage information 122 may include variable-specific information for specific instances of the object class generated by the application 104. The usage information 122 may also include statistical information that compares uses of the leak suspect object class to other object classes found in the memory dump 106. Statistical information may also include usage of specific object class objects/variables in relation to other objects/variables within the leak suspect object class or across other object classes in the memory dump 106.

In some embodiments, the usage information 122 generated by the pattern analysis tool 114 can be displayed or otherwise made available in an interface 120. The interface 120 may be displayed on a display device of the computer system. The interface may comprise an HTML report, XML output file, and/or any other structured or unstructured data collection. Displaying the usage information 122 in the interface 120 can provide a quick overview of information that a troubleshooter may use to quickly identify a root cause of the OOM error. As used herein, the term "root cause" may refer to a specific cause of the OOM error. For example, a root cause may include a query executed on a database. The root cause may also include a specific function call within an application. In some general cases, the root cause may refer to a specific variable name within the object class of the leak suspect. In any of these cases, the troubleshooter can quickly examine the usage information 122 and understand the underlying nature of the OOM error.

In some embodiments, the pattern analysis tool 114 can also analyze the usage information 122 and automatically identify a root cause of the OOM error. For example, the pattern analysis tool 114 can compare the usage information 122 for each of the list of leak suspects 112 and identify a single leak suspect that is most likely responsible for the OOM error. Next, the pattern analysis tool 114 can analyze the various individual objects for the identified leak suspect in the context of the application framework and identify a root cause (e.g. database query, function call, etc.) of the OOM error.

Compared to simply identifying a leak suspect, identifying the root cause of the OOM error is considerably more useful and efficient in remedying the situation. Prior to this disclosure, analyzing the memory dump 106 in relation to the list of leak suspects 112 was a manual operation that had to be done by someone understanding the underlying application 104 and/or application framework of the operating environment. Using these embodiments, a central pattern datastore 118 can be used to collect this application-specific information and automate the analysis of leak suspects without having to continually go back to application developers with nothing more than a memory dump 106 and a list of leak suspects 112. In some cases, the best time for an application developer to consider possible OOM errors is during actual development of the application 104. Therefore, when the application 104 is being developed, application developers can generate analysis patterns based on likely root causes (e.g., any repeated allocation of new memory). Then, months or years down the road when an actual OOM error occurs, the pattern analysis tool 114 can diagnose the root cause based on the best information provided from the application developer or by others intimately familiar with the underlying application framework. Because software engineers tend to frequently migrate between software development companies, generating a library of analysis patterns to later be used to identify leak suspects may provide significant advantages, according to at least some embodiments. Further, for every subsequent new OOM that requires manual triaging, a pattern file can be extended by incorporating the new triaging steps identified by the developers. This automates the triaging process.

Figure 11:
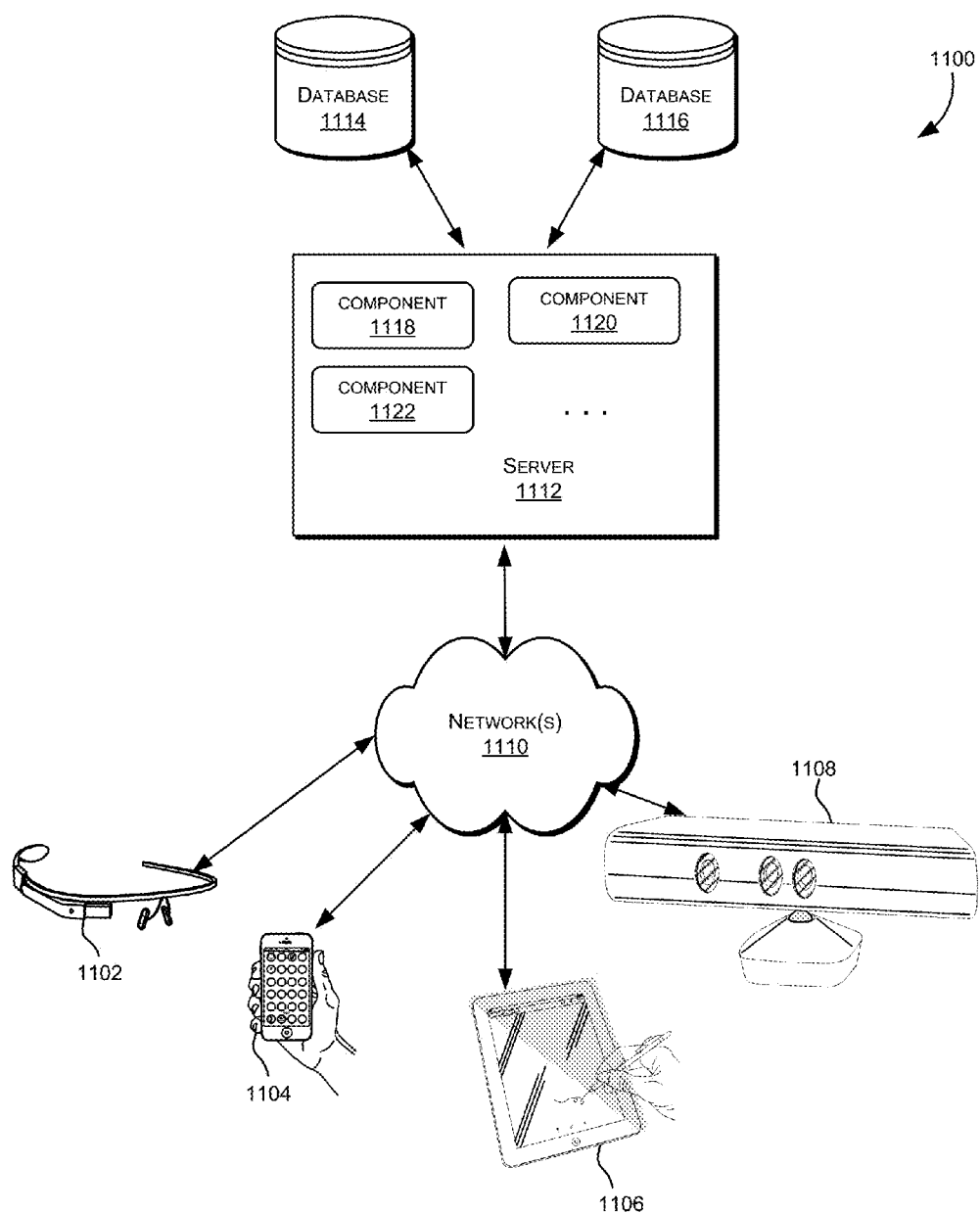
FIG. 11 illustrates a simplified block diagram of a distributed system for implementing some of the embodiments.
Figure 12:
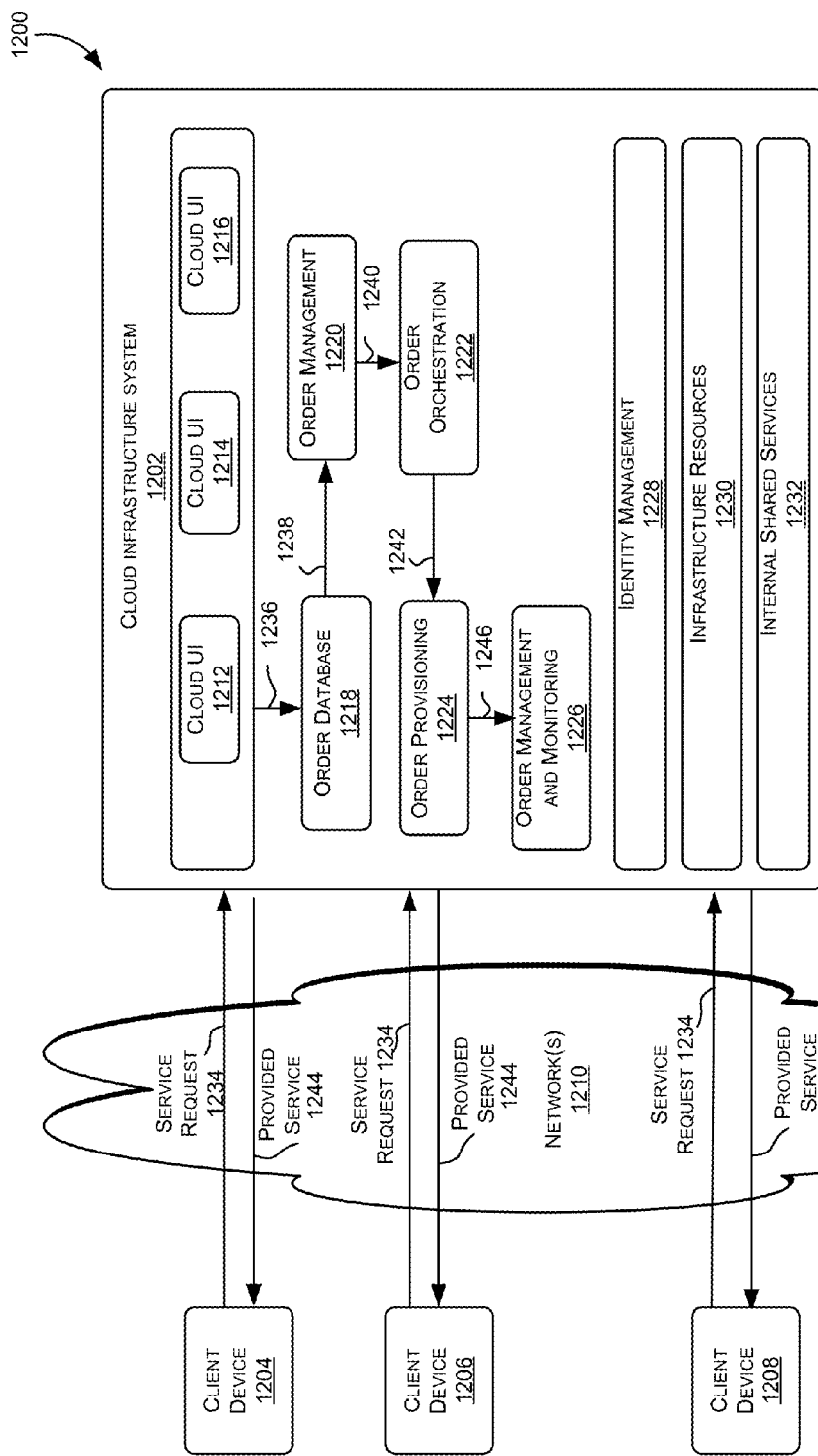
FIG. 12 illustrates a simplified block diagram of components of a system environment by which services provided by the components of an embodiment system may be offered as cloud services.
Figure 13:
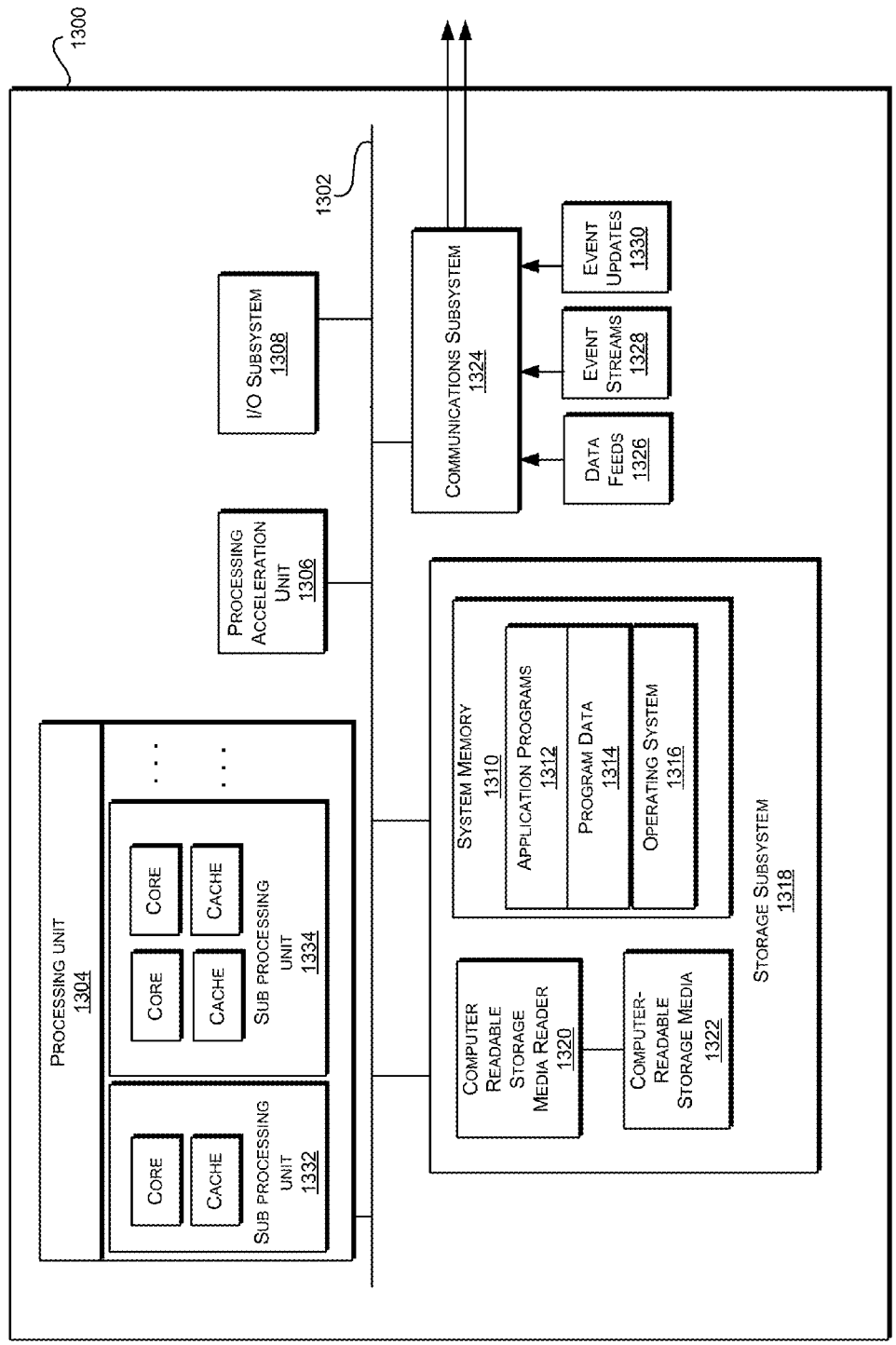
FIG. 13 illustrates an exemplary computer system, in which various embodiments may be implemented.

The methods and systems described herein may be implemented using one or more general purpose computer systems and/or a network computer environment, such as those described in relation to FIGS. 11-13. In other embodiments, a dedicated hardware platform may be designed to implement the functionality described herein. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. System 100 represents an abstraction of the functions that may be implemented using these types of hardware. After reading this disclosure, one having skill in the art could use these well-known circuit elements to construct the device shown in FIG. 1 to implement these methods and systems.

In some embodiments, the various modules and systems in FIG. 1 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments. Additionally, each of the modules and systems may be implemented in hardware, software, or a combination of hardware and software. The functions described above and throughout this disclosure may be implemented by providing a computer-readable medium that includes instructions to be executed by one or more processors. The instructions may cause the one or more processors to perform operations such as those described herein in relation to the present invention.

Figure 2:
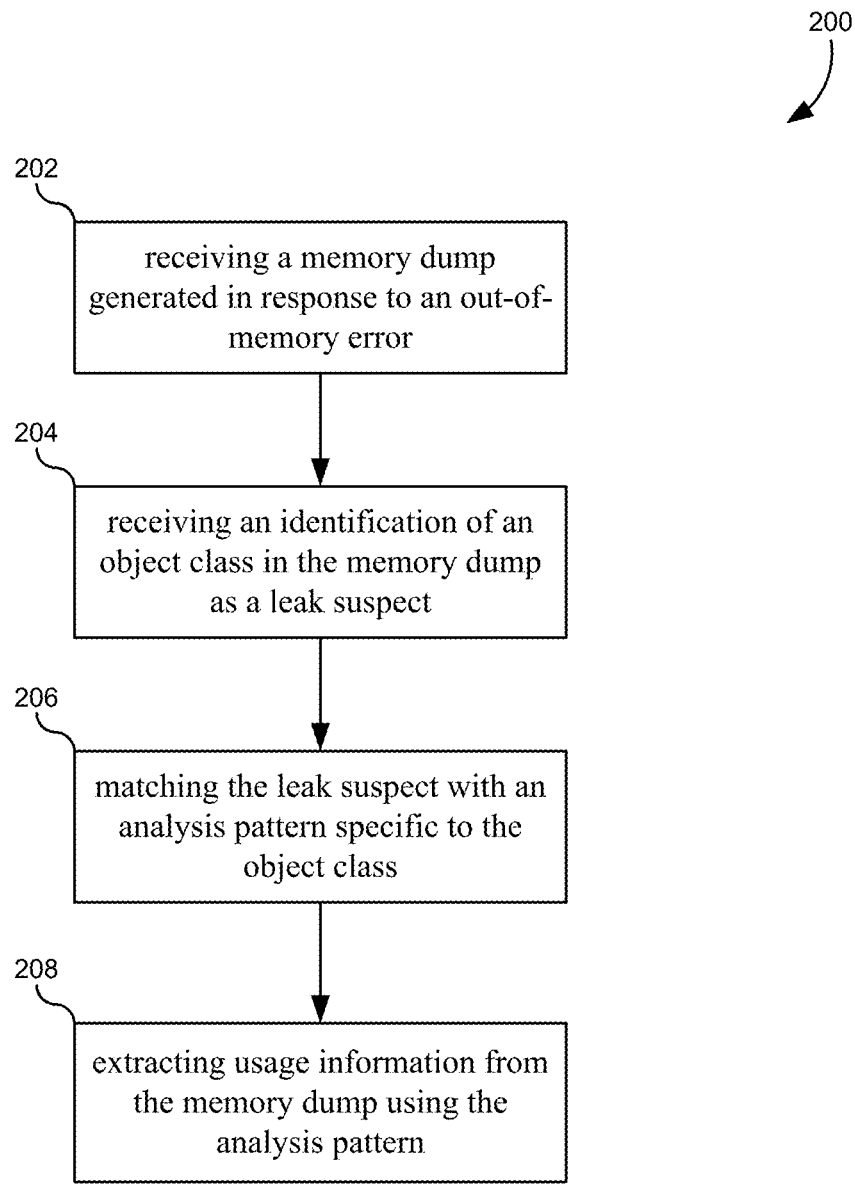
FIG. 2 illustrates a flowchart of a method of analyzing OOM errors, according to some embodiments.

FIG. 2 illustrates a flowchart 200 of a method of analyzing out-of-memory errors, according to some embodiments. This method may be executed by the pattern analysis tool 114 of FIG. 1. The method may include receiving a memory dump generated in response to an OOM error (202). The memory dump may be received raw from a virtual machine or may be indexed by a memory analysis tool. The method may also include receiving an identification of an object class in the memory dump as a leak suspect (204). The leak suspect may be identified as such because it is possibly responsible for the OOM error. The object class may be part of an application framework in which the source application or virtual machine operates. Diagnosis of a leak suspect may be based on a percentage of the memory dump that is attributed to the object class. The leak suspect may be received as a list of a plurality of leak suspects. The leak suspect(s) may be diagnosed by a memory analysis tool as described above that is configured to identify high-memory-consumption object classes in a memory dump.

The method may additionally include matching the leak suspect with an analysis pattern specific to the object class (206). The analysis pattern may draw on information that is specific to the application framework and may be designed prior to the occurrence of the OOM error. The analysis pattern may be selected from amongst a plurality of analysis patterns and may be matched to the leak suspect by virtue of an object class name or other identifying attribute. As will be described further below, the analysis pattern may be comprised of instructions that are specific to the application framework. The analysis pattern may also comprise an application framework language query that extracts at least a portion of the available usage information from the memory dump. The analysis pattern may also comprise instructions that allow a user to interpret the outputs of the pattern analysis tool. Additionally, the analysis pattern may include definitions that instruct the pattern analysis tool how to present statistical information comparing usage of the leak suspect objects to other object classes/instances. In one example, the analysis pattern may be stored as an XML file or any other structured data file.

The method may further include extracting usage information from the memory dump using the analysis pattern (208). The usage information may include a comparison of usage of the leak suspect object class in relation to other object classes in the application framework, where the other option classes were not identified leak suspects. The usage information may also include the usage of the leak suspect object class in comparison to other leak suspect object classes. The usage information may also include an original query associated with instances of the leak suspect object class that may be responsible for the OOM error. This information may be displayed in an interface as described above. For example, the usage information may be used to generate an HTML report that compares the usage information from a plurality of leak suspects identified by the memory analysis tool. In some embodiments, the interface may identify the root cause of the OOM error by highlighting, for example, application code that is statistically most likely to be the root cause.

It should be appreciated that the specific steps illustrated in FIG. 2 provide particular methods of analyzing OOM errors according to various embodiments of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3:
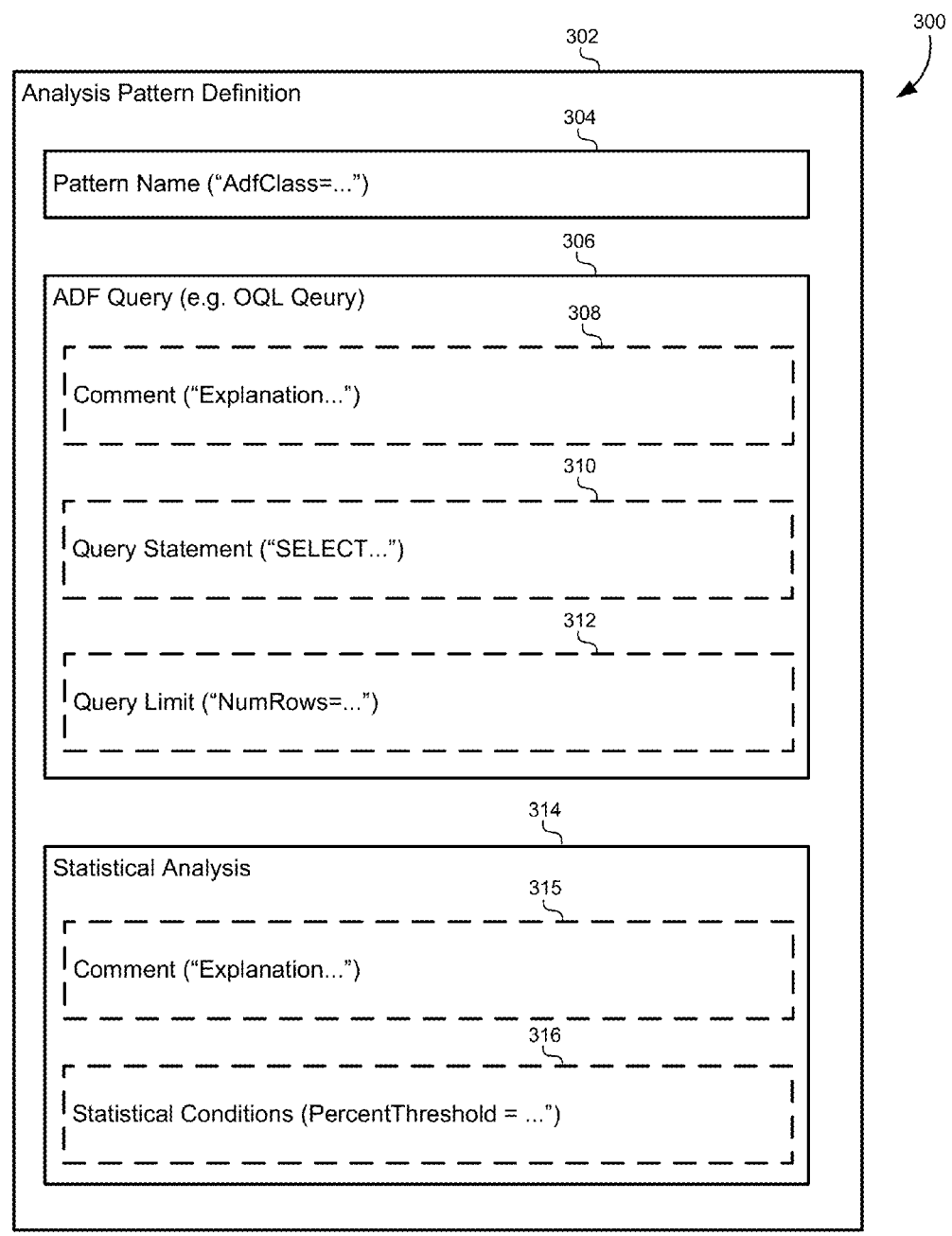
FIG. 3 illustrates a block diagram of a generic analysis pattern file, according to some embodiments.

FIG. 3 illustrates a block diagram 300 of a generic analysis pattern file 302, according to some embodiments. The analysis pattern file 302 illustrated by FIG. 3 is merely exemplary and illustrates a basic structure that one designing an analysis pattern could follow. The analysis pattern file 302 may include an identifier 304. The identifier 304 can provide a name for the pattern and be used to match the pattern with a leak suspect object class. For example, the identifier 304 may include a pattern name that matches a class name, such as OAViewRowImpl. Other exemplary patterns may use other attributes in the place of, or in addition to an object class name, such as a parent class type, a numerical identifier, and/or the like. Matching the leak suspect with the analysis pattern specific to the object class may then be accomplished by searching a plurality of analysis patterns and selecting the one with an identifier 304 that matches the object class name as identified by the memory analysis tool.

The analysis pattern file 302 may also include an application framework language query 306. This section include a content 308 that provides an explanation as to how the usage information returned by the application framework language query 306 should be interpreted by a user. The analysis pattern file 302 may also include a query statement 310, such as an SQL query, or a SELECT statement. This section may also include a query result format section 312 that formats and/or structures the information returned by the query. For example, the query result format section 312 may include a row limit specifying that the usage information should only display the first N rows returned by the query. This can prevent the usage information from becoming bloated with irrelevant results and keep user focused on the most likely root causes of the OOM error.

The analysis pattern file 302 may also include a statistical analysis section 314. As with the application framework language query 306, the statistical analysis section 314 may include a comment 315 to describe how a user should interpret the usage information returned by the statistical analysis section 314. This section can also include statistical conditions 316 that describe how the statistical analysis should be generated. For example, a percent threshold may be provided that limits the number of results. The number of results may also be limited by a row count. The statistical conditions 316 may also specify types of statistical analyses to be performed, such as a histogram analysis.

It will be understood that this analysis pattern file 302 is merely exemplary and not meant to be limiting. Depending on the particular application framework, various embodiments may develop pattern analysis tools and analysis patterns that may be specific to each environment.

Figure 4:
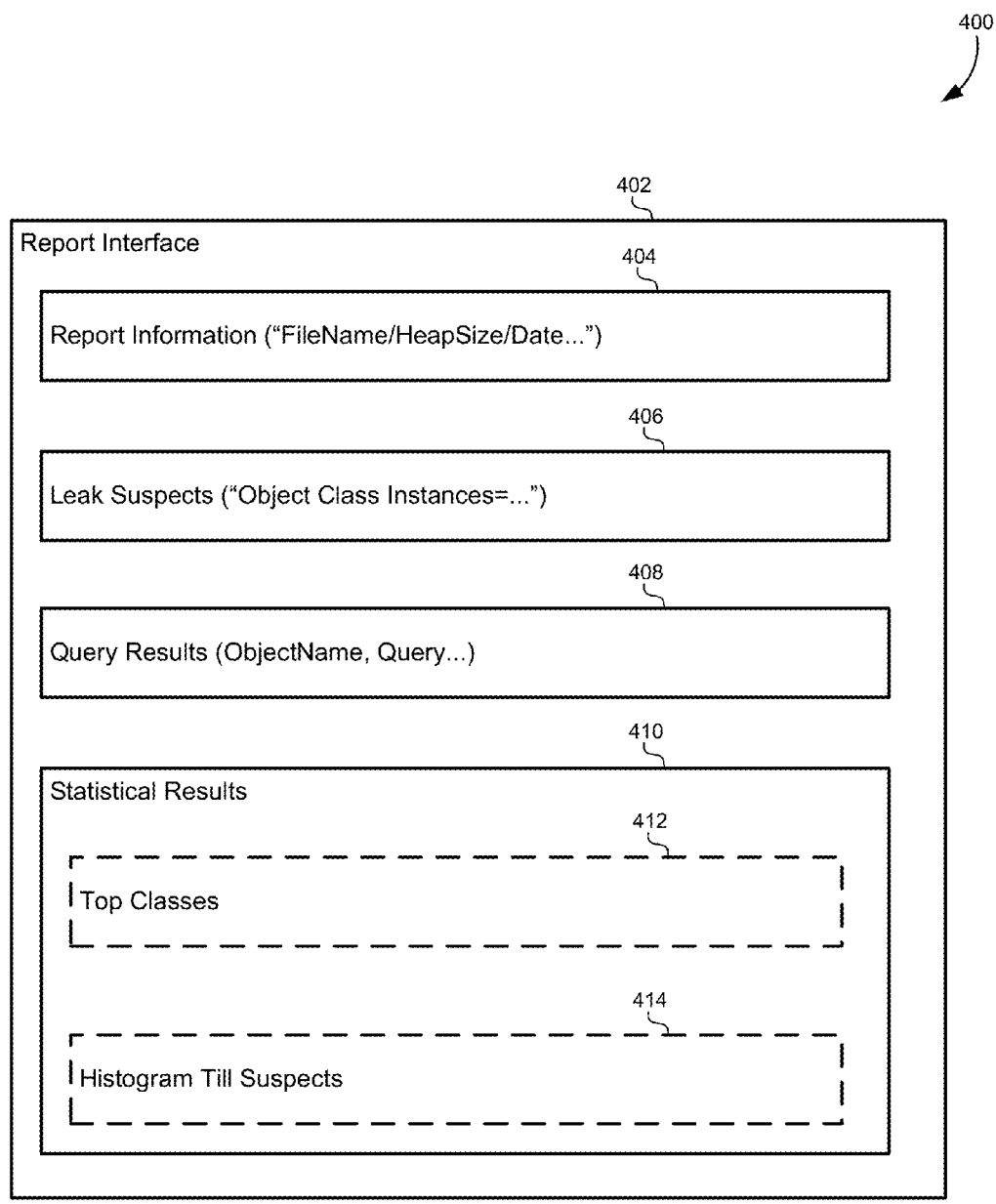
FIG. 4 illustrates an exemplary interface for displaying usage information generated using an analysis pattern, according to some embodiments.

FIG. 4 illustrates a diagram 400 of an exemplary interface 402 for displaying usage information generated using an analysis pattern, according to some embodiments. This report interface 402 may generate information based on the analysis pattern file 302 of FIG. 3. The report interface 402 may include basic report information 404, such as a filename, a heap size, a date, a login name, a computer system, an application framework, and/or the like. The report interface 402 may also include a list of leak suspects 406, which may include object class names, memory dump percentage, total number of instances, and/or the like. The list of leak suspects 406 may include any information provided by the memory analysis tool. Next, the report interface 402 may include query results 408 based on the application framework language query provided in the analysis pattern. The pattern analysis tool may execute this query, sort and categorize the returned information, and present the information in the report interface 402 as specified by the analysis pattern. The query results 408 may be presented in a table format with each column presenting a query result and each row presenting an object of the object class believed to be a root cause of the OOM error. Statistical results 410 may also be presented based on the corresponding section of the analysis pattern file. For example, the top classes 412 may be presented to illustrate how a particular leak suspect compares to other non-leak suspects in the overall view of the memory dump. In another example, a histogram 414 may be presented to illustrate how the leak suspect compares to other object classes in the application framework.

Figure 5:
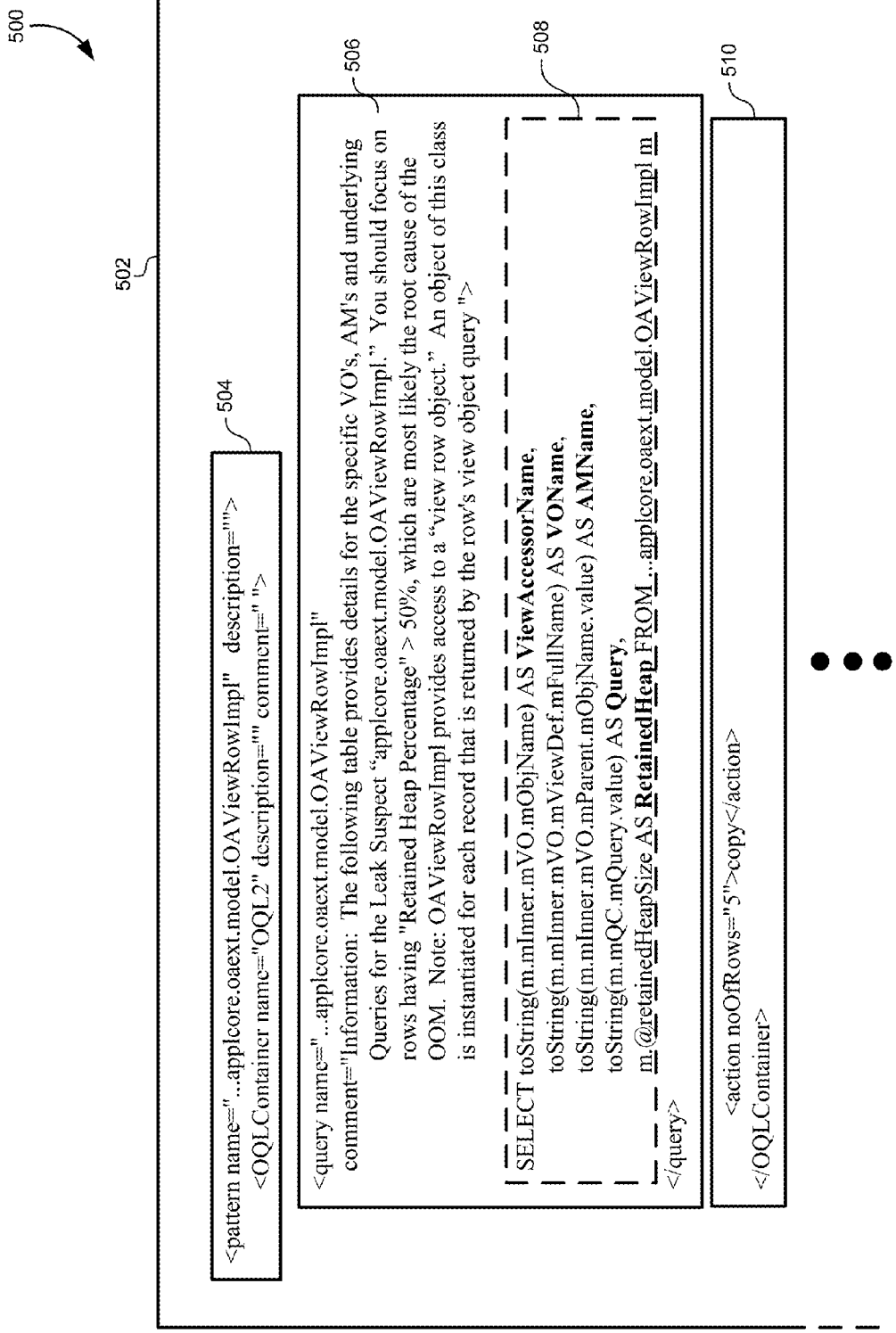
FIG. 5 illustrates a first portion of an exemplary analysis pattern, according to some embodiments.

FIG. 5 illustrates a diagram 500 of a first portion of an exemplary analysis pattern 502, according to some embodiments. The analysis pattern 502 generally follows the outline of FIG. 3. An identifier 504 includes the analysis pattern name that matches an object class from the application framework, namely OAViewRowImpl. The application framework language query is encapsulated in an a special container, namely an Oracle Query Language (OQL) container. The query itself has two main parts: a comment 506 and a SELECT statement 508. The comment 506 provides guidance for the user to interpret the information retrieved by the SELECT statement 508. The SELECT statement 508 is used to extract information from the memory dump that is specific to the application framework. In this example, the OAViewRowImpl object data are parsed, and object details that are specific to the application framework class are extracted. This includes the ViewAccessorName, VOName, AMName, Query, and RetainedHeap, along with the state of the underlying EntityRow. These values that would not be available without specific knowledge of the particular application framework class definitions. Finally, the analysis pattern 502 includes a limit on the number of rows retrieved by the SELECT statement to display in the interface. In this case, the number of rows is limited to 5 rows. The rest of the analysis pattern 502 will be discussed in relation to FIG. 8.

Figure 6:
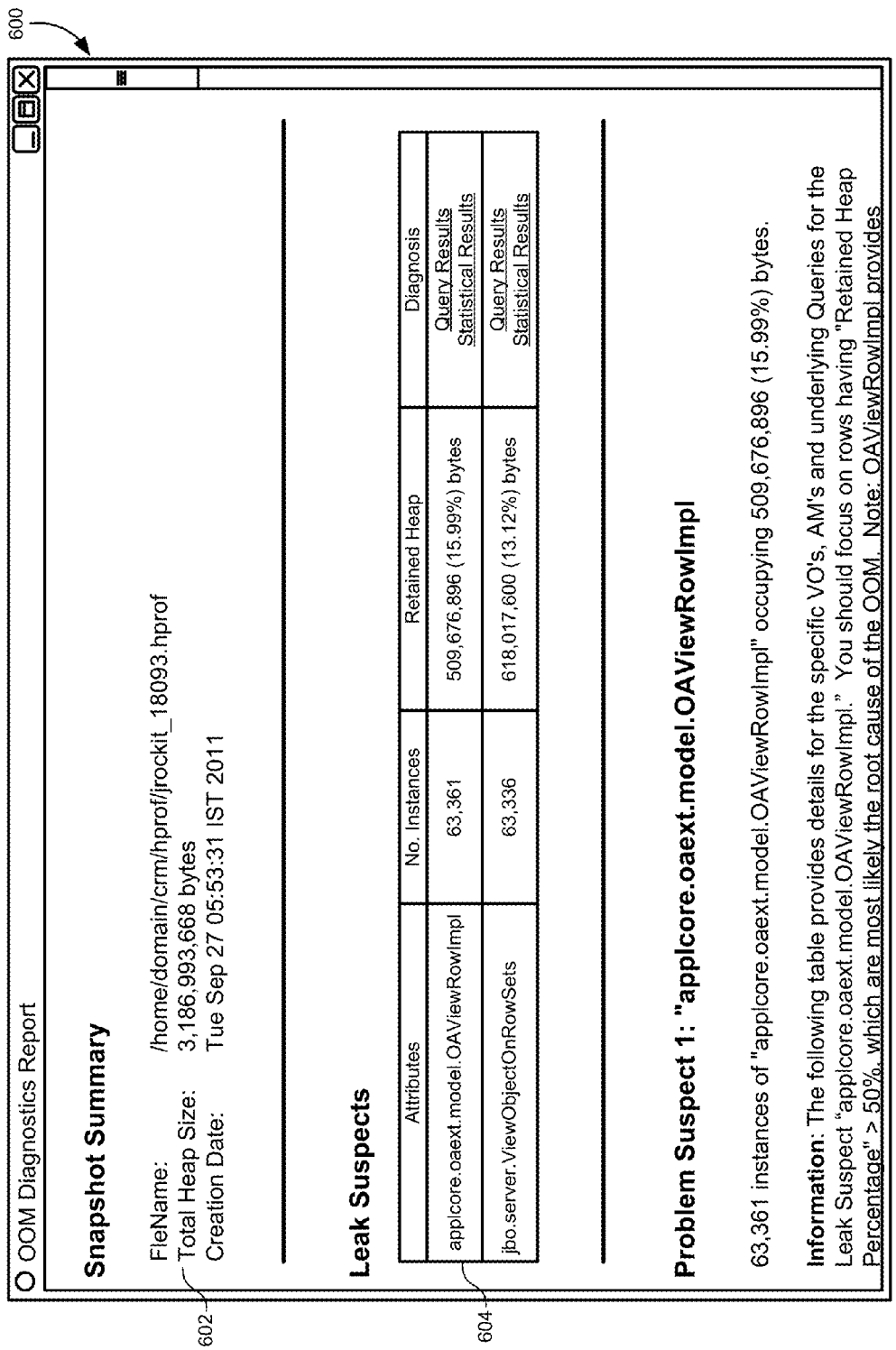
FIG. 6 illustrates an exemplary interface for displaying the summary information from an analysis pattern, according to some embodiments.

FIG. 6 illustrates an exemplary interface 600 for displaying the summary information from an analysis pattern, according to some embodiments. Interface 600 first includes a snapshot summary 602 of the OOM analysis, including a filename for the memory dump, the total size of the memory dump, and the date of the memory dump. The interface 600 also includes a summary of the leak suspects 604. As described above, the memory analysis tool may generate a list of one or more leak suspects that can be analyzed by the pattern analysis tool. The summary of leak suspects 604 provides an overview of the information provided by the memory analysis tool to the pattern analysis tool. This information may include object class names, a number of instances of the object in the memory dump, the percentage of the memory dump occupied by the leak suspect, and a set of links to locations within the report accessible by the interface 600 that can be used to jump quickly to the query results and/or statistical results for each of the leak suspects.

FIG. 7 illustrates an exemplary interface 700 for displaying the query results from an analysis pattern, according to some embodiments. Interface 700 may be a continuation of interface 600 illustrated in FIG. 6. Each of the leak suspects provided to the pattern analysis tool can be analyzed using an individual analysis pattern. Interface 700 illustrates the first portion of the analysis comprising the query results for the first leak suspect. According to the analysis pattern of FIG. 5, interface 700 displays a summary 702 of the information for the first leak suspect object class (OAViewRowImpl). The information 707 comes from the comments of the corresponding analysis pattern, and provides information that will help a user interpret the results of the query. The query result 706—the results of the SELECT statement in this case—may be displayed in a table format that ranks objects in the object class that pass the threshold defined by the analysis pattern.

By way of example, a user attempting to diagnose the root cause of an OOM error can look at interface 700 and by reading the information 707 understand that any of the objects that score above 50% of the retained the percentage are likely the root cause of the OOM. Then, by viewing the query result 706, they could see that the object PartyUniqueNameExistVA occupies well above 50% of the retained heap. The query result 706 also provides an original query that generated the PartyUniqueNameExistVA object. The user could then determine that the application executing the query is likely not releasing memory as it should and thus pinpoint the root cause of the OOM error. Alternatively or additionally, the analysis pattern may include a set of thresholds and parameters that can be used by the pattern analysis tool to automatically identify the PartyUniqueNameExistVA object as the root cause. In this case, the row in the query results 706 could be highlighted for the user, or an indication could automatically be sent to application development team responsible for the OOM error.

Figure 8:
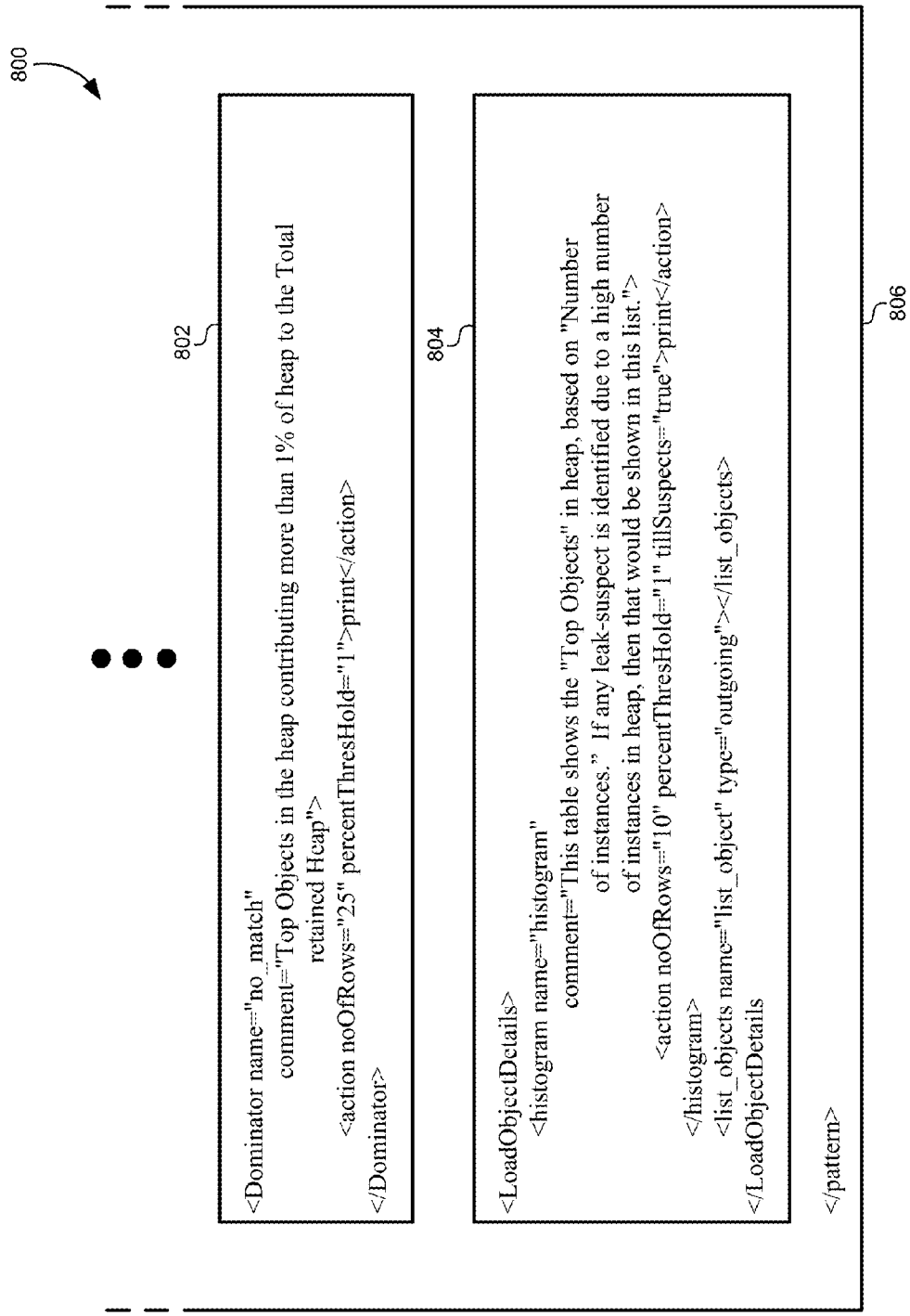
FIG. 8 illustrates a second portion of an exemplary analysis pattern, according to some embodiments.

FIG. 8 illustrates a diagram 800 of a second portion of an exemplary analysis pattern file 806, according to some embodiments. As described above, in addition to query information, the pattern analysis file 806 may also include statistical information used by the pattern analysis tool to generate usage information, including a statistical analysis of the leak suspect object class in comparison to other objects and/or classes. A first type of statistical information 802 includes instructions for the pattern analysis tool to analyze the top objects in the heap that contribute more than 1% of the total retained memory dump. The first type of statistical information 802 also limits the number of objects retrieved by the pattern analysis tool to 25 objects that occupy more than 1% of the memory dump. A second type statistical information 804 performs a similar analysis based on the total number of instances for each object. Similarly, the number of objects reported by the pattern analysis tool is limited to an integer number and other inputs to the statistical analysis are provided as shown in the second type of statistical information 804.

Figure 9:
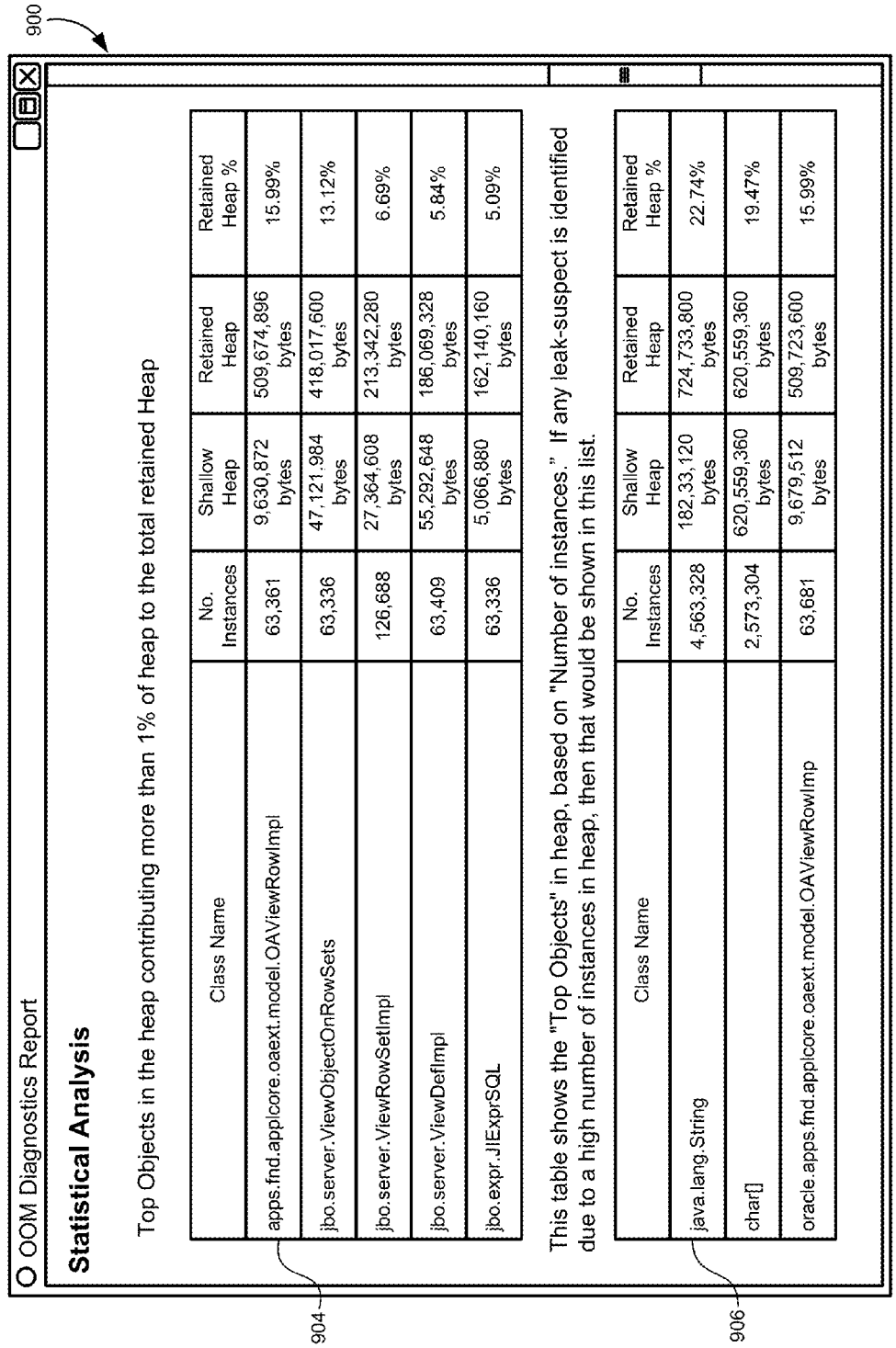
FIG. 9 illustrates an exemplary interface for displaying the statistical information from an analysis pattern, according to some embodiments.

FIG. 9 illustrates an exemplary interface 900 for displaying the statistical information from an analysis pattern, according to some embodiments. Interface 900 includes usage information that includes statistical results according to the information provided by the corresponding analysis pattern of FIG. 8. Specifically, first table of statistical results 904 identifies top objects in the heap, and a second table of statistical results 906 identifies top objects based on the number of instances as specified by the analysis pattern.

Figure 10:
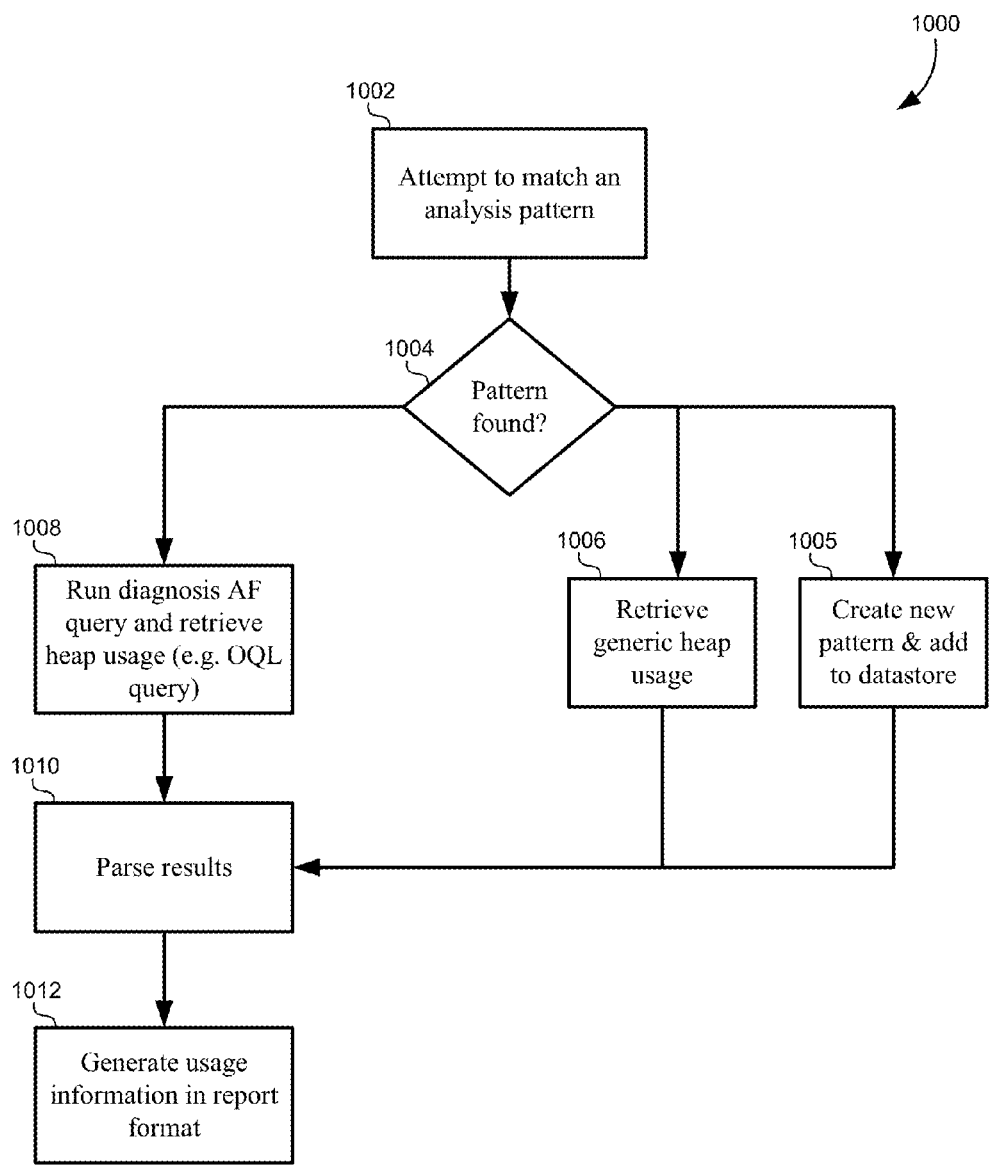
FIG. 10 illustrates a flowchart of a method for analyzing a leak suspect, according to some embodiments.

FIG. 10 illustrates a flowchart 1000 of a method for analyzing a leak suspect, according to some embodiments. This method deals with cases where no analysis pattern can be matched to an object class identified as a leak suspect. This situation can occur when pattern and application designers are not aware that certain object classes may result in an OOM error. Instead of needing to generate analysis patterns for each possible object class, a number of default patterns can be used and/or patterns can be generated on-the-fly as unmatched object classes are identified. Alternatively, when an object is unmatched, the developers can be instructed to analyze and provide new triaging steps to either augment an existing pattern or create a new pattern in the pattern data store.

The method may include attempting to match the leak suspect to an analysis pattern (1002). If the pattern is found (1004), then the pattern analysis tool can continue executing the method as described above by running the application framework language query and retrieving usage information (1008), parsing the results (1010), and generating usage information in report format (1012). Alternatively, if a pattern is not found (1004), then a generic pattern may instead be used (1006). In some cases, a new pattern can be created and added to the data store (1005). The generic pattern can forgo executing an application framework language query since the details of the object class are unknown. Instead, the generic pattern can include the statistical information used to carry out a statistical analysis on the object class itself in relation to other object classes in the retained heap. Generally, this information can be executed without detailed information specific to the object class, and may provide useful clues for identifying objects that are related to the root cause of the OOM error. In some embodiments, an application framework language query can be constructed on the fly by selecting a subset of data encapsulated within the object class for analysis. After running the generic analysis pattern, the results can be parsed (1010) and reported (1012) as usual. Further, for every subsequent new OOM that uses a 'generic pattern' and that may require manual triaging later, this pattern datastore can be extended by incorporating this new "leak suspect" along with its triaging steps identified by the developers, so that subsequent triaging becomes automated.

It should be appreciated that the specific steps illustrated in FIG. 10 provide particular methods of matching patterns according to various embodiments of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system, such as computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

FIG. 12 is a simplified block diagram of one or more components of a system environment 1200 by which services provided by one or more components of an embodiment system may be offered as cloud services, in accordance with an embodiment of the present disclosure. In the illustrated embodiment, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the embodiment shown in the figure is only one example of a cloud infrastructure system that may incorporate an embodiment of the invention. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1102, 1104, 1106, and 1108.

Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients 1204, 1206, and 1208 and cloud infrastructure system 1202. Each network may be any type of network familiar to those skilled in the art that can support data communications using any of a variety of commercially-available protocols, including those described above for network(s) 1110.

Cloud infrastructure system 1202 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in the figure, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1218 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain embodiments, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client devices 1204, 1206 and/or 1208 by order provisioning module 1224 of cloud infrastructure system 1202.

At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain embodiments, cloud infrastructure system 1200 may include an identity management module 1228. Identity management module 1228 may be configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

FIG. 13 illustrates an exemplary computer system 1300, in which various embodiments of the present invention may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present invention.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of analyzing out-of-memory errors, the method comprising:
    receiving, using a computer system, a memory dump generated in response to an out-of-memory error;
    receiving, using the computer system, an identification of an object class in the memory dump as a leak suspect that may be responsible for the out-of-memory error, wherein the object class is identified as a leak suspect based on an amount of the memory dump used by the object class;
    matching, using the computer system, and in response to identifying the object class as a leak suspect, the leak suspect to an analysis pattern from among a plurality of analysis patterns, wherein:
        the analysis pattern comprises a collection of instructions specific to the object class that extract additional information from the memory dump for the leak suspect; and
        the analysis pattern is matched to the leak suspect based on the object class of the leak suspect; and
    extracting, using the computer system, usage information from the memory dump using the analysis pattern, wherein the usage information comprises statistics for all instances of at least one variable name in the object class.

2. The method of claim 1, wherein the analysis pattern comprises instructions that are specific to an application framework used to develop applications running on the computer system.

3. The method of claim 1, wherein each of the plurality of analysis patterns is specific to individual object classes.

4. The method of claim 1, wherein the analysis pattern comprises an application framework language query that extracts at least a portion of the usage information from the memory dump.

5. The method of claim 1, wherein the usage information comprises a list of instances of the object class that are most prevalent in the memory dump.

6. The method of claim 5, wherein, for each of the instances of the object class, the usage information comprises an original query that generated the instance of the object class.

7. The method of claim 1, wherein the usage information comprises a comparison of usage of the object class in relation to other object classes in an application framework that were not identified as leak suspects.

8. The method of claim 1, wherein the object class is identified as a leak suspect based on a percentage of the memory dump that is attributed to the object class.

9. The method of claim 1, wherein the identification of the object in the memory dump as a leak suspect is provided by a memory analyzer tool configured to identify high-memory consumption object classes.

10. The method of claim 1, further comprising:
receiving an identification of a second object class in the memory dump as a second leak suspect;
matching the second leak suspect with a second analysis pattern;
extracting second usage information from the memory dump using the second analysis pattern; and
causing the usage information and the second usage information to be displayed together in an interface to compare the leak suspect to the second leak suspect.

11. A non-transitory, computer-readable medium comprising instructions which, when executed by one or more processors, causes the one or more processors to perform operations comprising:
receiving a memory dump generated in response to an out-of-memory error;
receiving an identification of an object class in the memory dump as a leak suspect that may be responsible for the out-of-memory error, wherein the object class is identified as a leak suspect based on an amount of the memory dump used by the object class;
matching, in response to identifying the object class as a leak suspect, the leak suspect to an analysis pattern from among a plurality of analysis patterns, wherein:
the analysis pattern comprises a collection of instructions specific to the object class that extract additional information from the memory dump for the leak suspect; and
the analysis pattern is matched to the leak suspect based on the object class of the leak suspect; and
extracting usage information from the memory dump using the analysis pattern, wherein the usage information comprises statistics for all instances of at least one variable name in the object class.

12. The non-transitory, computer-readable medium of claim 11, wherein the instructions cause the one or more processors to perform additional operations comprising:
receiving an identification of a second object class in the memory dump as a second leak suspect;
attempting to match the second leak suspect with one of a plurality of analysis patterns;
determining that none of the plurality of analysis patterns match the second leak suspect; and
generating automatically a new analysis pattern that matches the second leak suspect.

13. The non-transitory, computer-readable medium of claim 11, wherein the instructions cause the one or more processors to perform additional operations comprising:
receiving an identification of a second object class in the memory dump has a second leak suspect;
attempting to match the second leak suspect with one of a plurality of analysis patterns;
determining that none of the plurality of analysis patterns match the second leak suspect; and
selecting a generic analysis pattern that generates usage information comprising a comparison of usage of the second object class in relation to other object classes in an application framework.

14. The non-transitory, computer-readable medium of claim 13, wherein the instructions cause the one or more processors to perform additional operations comprising:
receiving a new pattern from a developer of the application that caused the out-of-memory error that is responsive to the out-of-memory error.

15. The non-transitory, computer-readable medium of claim 11, wherein the instructions cause the one or more processors to perform additional operations comprising causing the usage information for the leak suspect to be displayed in an interface, wherein the usage information is presented in the interface based on which instance of the object class is most likely responsible for the out-of-memory error.

16. A system comprising:
one or more processors; and
one or more memory devices comprising instructions which, when executed by the one or more processors, cause the one or more processors to perform operations comprising:
receiving a memory dump generated in response to an out-of-memory error;
receiving an identification of an object class in the memory dump as a leak suspect that may be responsible for the out-of-memory error, wherein the object class is identified as a leak suspect based on an amount of the memory dump used by the object class;
matching, in response to identifying the object class as a leak suspect, the leak suspect to an analysis pattern from among a plurality of analysis patterns, wherein:
the analysis pattern comprises a collection of instructions specific to the object class that extract additional information from the memory dump for the leak suspect; and
the analysis pattern is matched to the leak suspect based on the object class of the leak suspect; and
extracting usage information from the memory dump using the analysis pattern, wherein the usage information comprises statistics for all instances of at least one variable name in the object class.

17. The system of claim 16, wherein the out-of-memory error occurs while an application is running on a virtual machine.

18. The system of claim 16, wherein the analysis pattern comprises an XML file that is used as an input to a pattern analysis tool.

19. The system of claim 18, wherein the pattern analysis tool receives inputs comprising:
the analysis pattern;
the memory dump; and
the indication of the object class.

20. The system of claim 16, wherein the analysis pattern comprises instructions that are specific to an application framework used to develop applications running on the computer system.

* * * * *

UNITED STATES PATENT AND TRADEMARK OFFICE
CERTIFICATE OF CORRECTION

PATENT NO. : 10,108,475 B2
APPLICATION NO. : 14/464586
DATED : October 23, 2018
INVENTOR(S) : Chikabelapur et al.

Page 1 of 1

It is certified that error appears in the above-identified patent and that said Letters Patent is hereby corrected as shown below:

In the Specification

In Column 9, Line 38, delete "an a" and insert -- a --, therefor.

In the Claims

In Column 25, Line 2, in Claim 9, after "object" insert -- class --.

In Column 26, Line 8, in Claim 14, delete "the" and insert -- an --, therefor.

In Column 26, Line 54, in Claim 19, delete "indication" and insert -- identification --, therefor.

In Column 26, Line 57, in Claim 20, delete "the" and insert -- a --, therefor.

Signed and Sealed this
Seventh Day of January, 2020

Andrei Iancu
*Director of the United States Patent and Trademark Office*